UNITED STATES PATENT OFFICE.

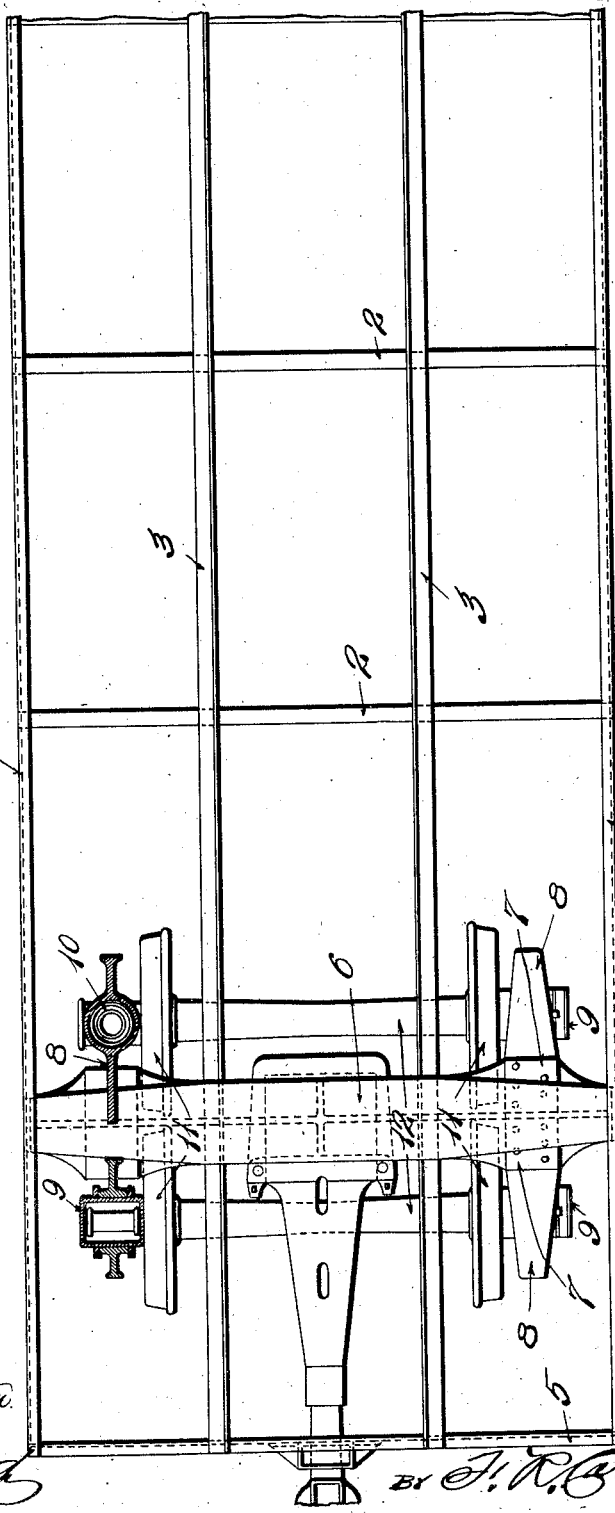

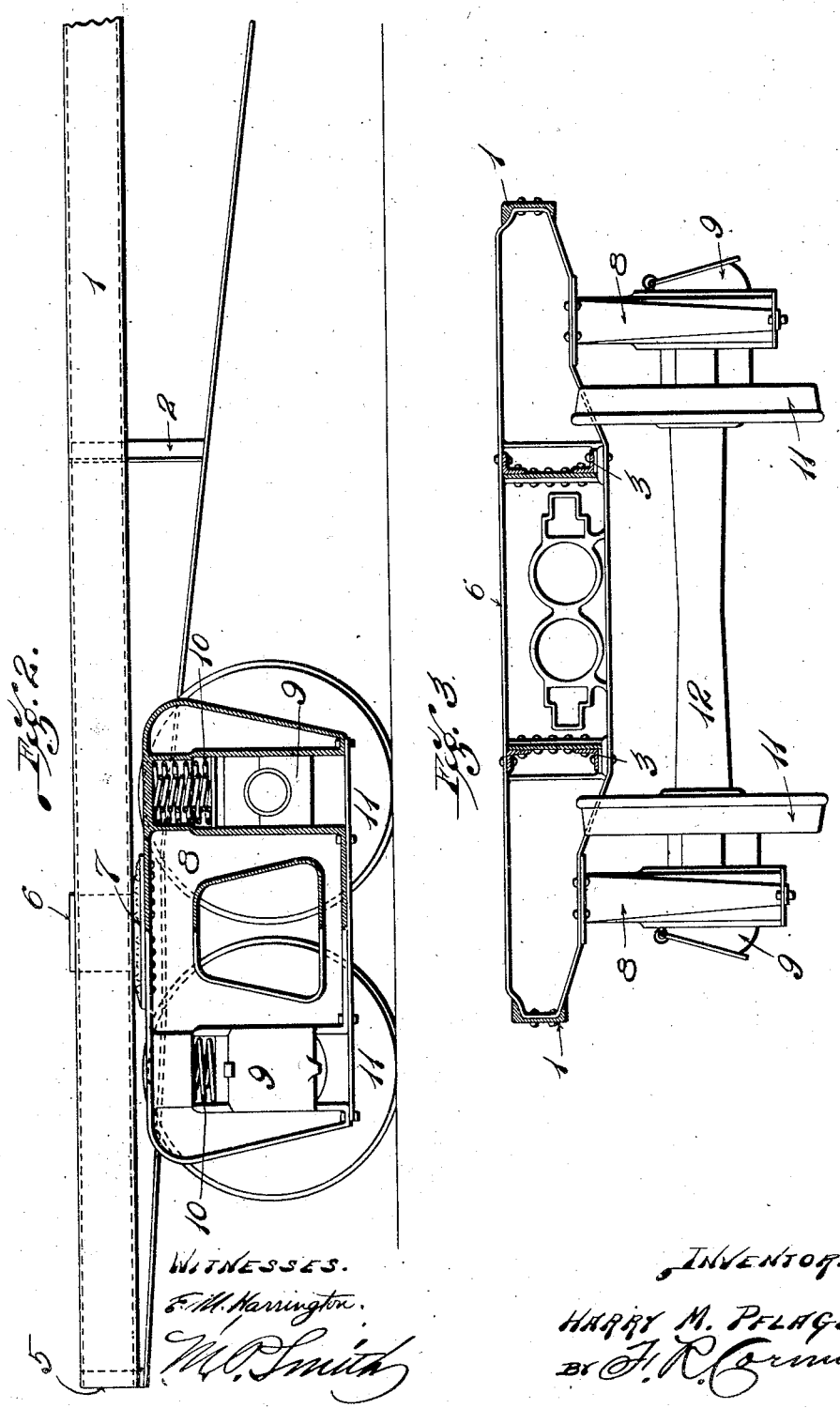

HARRY M. PFLAGER, OF ST. LOUIS, MISSOURI.

CAR CONSTRUCTION.

979,030.     Specification of Letters Patent.     Patented Dec. 20, 1910.

Application filed April 26, 1910. Serial No. 557,679.

*To all whom it may concern:*

Be it known that I, HARRY M. PFLAGER, a citizen of the United States, residing at St. Louis, Missouri, have invented a certain new and useful Improvement in Car Construction, of which the following is a full, clear, and exact description, such as will enable others skilled in the art to which it appertains to make and use the same, reference being had to the accompanying drawings, forming part of this specification, in which—

Figure 1 is a top plan view partly in horizontal section of my improved car construction. Fig. 2 is a side elevational view, partly in vertical section; and Fig. 3 is an end elevational view, partly in section.

This invention relates to a new and useful improvement in car construction, the object being to construct a car that will not require the expensive swiveled trucks now in common use in this country, and to produce a car that will go around sharp curves, over switches and cross-overs, without a swiveling truck thus reducing the first cost of building the car, the cost of maintenance and the dead weight of the car.

With this object in view, my invention consists in supporting the car at each end by pairs of wheels arranged closely together and having narrow wheel bases, said wheels being mounted either in rigid non-swiveling trucks or in guides fastened to part of the under frame.

I am aware that in England the so-called "wagons" have been mounted upon one pair of wheels at each end, arranged in boxes extending from the under frame at each end of car, but such constructions are identified with cars of light-carrying capacity and will not meet the conditions existing in this country, where it is desirable to carry great loads and bulk in the cars, and it is still desirable to further increase the capacity of the cars in the United States.

In the drawing, 1 indicates the side sills, 2 the cross bearers, 3 the center sills made in any preferable form now common in car construction, 5 the end sill of the car, 6 the bolster having lateral extensions 7 extending over a truck side frame 8, preferably made of cast steel and having downwardly opening guideways in which are mounted journal boxes 9. Above these journal boxes are supporting springs 10, which may be made in any desired form.

11 are the wheels whose axles 12 are received in the journal boxes as usual, said wheels being arranged as closely together as is practicable, so as to shorten up the wheel base or distance from center to center of axle, to the narrowest possible and practical limits. These wheels, as shown in Figs. 1 and 3, are provided with flanges at their inner edges and have their treads coned, they being fixed to the axle in the usual way. The coning of the treads assists the wheels in taking curves and enables the wheel riding the outer rail to travel a greater distance on a curve and so diminishes wear of the wheels, the wheel on the inner curved rail of course riding on its reduced diameter. In this way the two pairs of wheels at each end of the car will take curves of small radius without derailment. The narrower the wheel base, the more easily and readily the two pairs of wheels will be enabled to take small curves. The very narrow wheel base acts as a pivot for the end of the car when rounding a curve and almost in the same manner as one pair of wheels of large diameter.

By the use of my improvement a great saving is effected in the omission of parts usually necessary in a swivel truck construction, and a great saving is made in the cost of construction of the car and a reduction in the weight of the car, and because of the omission of these numerous parts the liability of derangement and necessity of repairs is reduced to a minimum. Furthermore, in swiveling trucks when the body is hard on the side bearings derailment of the car in taking short curves is practically a certainty, because of the length of the wheel base, and the inability of the truck to swing on its center bearings. In my construction there is no side bearing and the absence of a swiveling motion will not produce derailment because of the narrow wheel base.

I am aware that minor changes may be made in the construction, arrangement and combination of the several parts of my device without in the least departing from the nature and principle of my invention.

I claim:

1. In car construction, the combination of an underframe, two pairs of wheels under each end of the car, the wheels at each end being arranged closely together and having narrow wheel bases, and said wheels being mounted so as to be horizontally immovable with respect to the underframe.

2. In car construction, the combination of an under frame, pairs of pedestal guides having a fixed relation to the car-body, the bolster to which said pedestal guides are secured, and pairs of flanged and coned wheels having narrow wheel bases.

3. In car construction, the combination of an underframe, a non-swiveling bolster rigidly connected to said underframe, two or more pairs of pedestal guides extending from each end of said bolster, journal boxes arranged in said pedestal-guides, and pairs of flanged and coned wheels mounted in said journal boxes.

4. In car construction, the combination of an underframe, a non-swiveling bolster rigidly connected to said underframe, two or more pairs of pedestal guides extending from each end of said bolster, journal boxes arranged in said pedestal-guides, pairs of flanged and coned wheels mounted in said journal boxes, and springs arranged above the journal boxes.

In testimony whereof I have hereunto affixed my signature in the presence of two witnesses, this 22nd day of April, 1910.

HARRY M. PFLAGER.

Witnesses:
M. P. SMITH,
ALINA GEBHART.